Image (12) United States Patent
Awfi (10) Patent No.: US 11,313,986 B2
(45) Date of Patent: Apr. 26, 2022

(54) MAPPING SURFACE FEATURES FROM STACKED SEISMIC DATA

(71) Applicant: Saudi Arabian Oil Company, Dhahran (SA)

(72) Inventor: Sami N. Awfi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 74 days.

(21) Appl. No.: 16/813,205

(22) Filed: Mar. 9, 2020

(65) Prior Publication Data

US 2021/0278557 A1 Sep. 9, 2021

(51) Int. Cl.
*G01V 1/30* (2006.01)
*G01V 1/36* (2006.01)

(52) U.S. Cl.
CPC .............. *G01V 1/302* (2013.01); *G01V 1/307* (2013.01); *G01V 1/362* (2013.01); *G01V 2210/48* (2013.01)

(58) Field of Classification Search
CPC ........ G01V 1/302; G01V 1/307; G01V 1/362; G01V 2210/48
See application file for complete search history.

(56) References Cited

U.S. PATENT DOCUMENTS 7,355,923 B2 4/2008 Reshef et al.
7,796,468 B2 9/2010 Kellogg
8,760,966 B2 6/2014 Laake et al.
9,852,373 B2 * 12/2017 De Stefano ............ G06N 7/00
10,795,040 B2 * 10/2020 Aarre ..................... G01V 1/307
2016/0259075 A1 * 9/2016 Tyagi ..................... G01V 1/364

FOREIGN PATENT DOCUMENTS

EP 1000369 5/2000

OTHER PUBLICATIONS

Ballard, "Detection of karst cavities by geophysical methods," Bulletin of the International Association of Engineering Geology, Dec. 1982, 26(1): 153-157, English Summary.
(Continued)

*Primary Examiner* — Elias Desta
(74) *Attorney, Agent, or Firm* — Fish & Richardson P.C.

(57) ABSTRACT

Methods, apparatus, and systems for mapping surface and near surface features and processing artifacts from stacked and processed seismic data are disclosed. In some implementations, a computer system receives a three-dimensional (3D) seismic cube including seismic reflectivity data obtained at a geographical location. The computer system generates a vertical analysis window of the 3D seismic cube. The computer system extracts a second 3D seismic cube from the seismic reflectivity data based on the vertical analysis window. The second 3D seismic cube has multiple vertical amplitude traces associated with the seismic reflectivity data. The computer system generates 3D data comprising multiple frequency traces from the multiple vertical amplitude traces using a domain transform. The computer system generates a two-dimensional (2D) map from the 3D data. The 2D map represents geographical features of the geographical location.

20 Claims, 7 Drawing Sheets

(56) References Cited

OTHER PUBLICATIONS

Belfer et al., "Detection of shallow objects using refracted and diffracted seismic waves," Journal of Applied Geophysics, Jan. 1998, 38(3): 155-168.
Doll et al., "Overview of Karst Effects and Karst Detection in Seismic Data from the Oak Ridge Reservation, Tennessee," U.S. Army Environmental Center, Aberdeen, MD, in U.S. Geological Survery Karst Interest Group Proceedings: Scientific Investigations Report, Rapid City, South Dakota, Sep. 12-15, 2005, p. 20-28.
Smith, "The State of the Art of Geophysics and Karst: A General Literature Review," U.S. Geological Survey, Denver, Colorado, in U.S. Geological Survery Karst Interest Group Proceedings: Scientific Investigations Report, Rapid City, South Dakota, Sep. 12-15, 2005, p. 10-16.
PCT International Search Report and Written Opinion in International Appln. No. PCT/US2021/021480, dated Jun. 22, 2021, 14 pages.
Dirstein et al., "Insights from the Automated Extraction of Surfaces from the Bunda 3D Seismic Survey," West Australian Basins Symposium, Aug. 2013, XP055682120, 21 pages.
Hills et al., "Searching for Similarity in a Slab of Seismic Data," The Leading Edge, Society of Exploration Geophysicists, Feb. 2006, 25(2): 169-170, 172, 174, 176, XP001239322, 8 pages.

\* cited by examiner

```
┌─────────────────────────────────────────────────────────────────────┐
│ Receive, by a computer system, a three-dimensional (3D) seismic cube comprising │
│         seismic reflectivity data obtained at a geographical location           │
│                                     104                                         │
└─────────────────────────────────────────────────────────────────────┘
                                      │
                                      ▼
┌─────────────────────────────────────────────────────────────────────┐
│ Generate, by the computer system, a vertical analysis window of the 3D seismic  │
│                                     cube                                        │
│                                     108                                         │
└─────────────────────────────────────────────────────────────────────┘
                                      │
                                      ▼
┌─────────────────────────────────────────────────────────────────────┐
│ Extract, by the computer system, a second 3D seismic cube from the seismic      │
│ reflectivity data based on the vertical analysis window, the second 3D seismic  │
│ cube having a plurality of vertical amplitude traces associated with the seismic│
│                             reflectivity data                                   │
│                                     112                                         │
└─────────────────────────────────────────────────────────────────────┘
                                      │
                                      ▼
┌─────────────────────────────────────────────────────────────────────┐
│ Generate, by the computer system, 3D data comprising a plurality of frequency   │
│ traces from the plurality of vertical amplitude traces using a domain transform │
│                                     116                                         │
└─────────────────────────────────────────────────────────────────────┘
                                      │
                                      ▼
┌─────────────────────────────────────────────────────────────────────┐
│ Generate, by the computer system, a two-dimensional (2D) map from the 3D data,  │
│   the 2D map representing geographical features of the geographical location    │
│                                     120                                         │
└─────────────────────────────────────────────────────────────────────┘
```

Function: Analyze seismic cube, input 3D cube, parameter vertical window min and max, output 3D cube
For all x,y locations in the input cube
   Trace ← extract trace samples from input cube @x,y
   Trace ← clip Trace according to vertical window min&max
   FTrace ← Fast Fourier Transform of (Trace)
   FTrace ← magnitude of (FTrace)
   Outputcube[x,y] ← FTrace
End

FIG. 3A

Function: generate 2D map, input 3D frequency strength cube (FC), output 2Dmap
Create empty 2D output_map of dimension [X,Y]
For every x,y trace location on the 3D frequency cube:
   Output ← 1
   Count ← 0
   for f ← fmin to fmax increment by finc:
     output ← output * FC[at x,y,f]
     Increment count by 1
   End for
   Output ← $(output)^{\frac{1}{Count}}$
   Output_map[x,y] ← output
End for
Output is output_map

FIG. 3B

Function: scale 2D map, input 2D map, output 2d map
Create empty 2D output_map of dimension [X,Y]
Maxvalue ← maximum value in the input 2D map
Minivalue ← minimum value in the input 2D map
Range ← maxvalue - minivalue
For every x,y trace location on the input 2D map:
    Output ← input2Dmap[x,y] - minivalue
    Output ← 100* output/range
    Output_map[x,y]← output
End for
Result is output_map

MAPPING SURFACE FEATURES FROM STACKED SEISMIC DATA

TECHNICAL FIELD

This description relates generally to geophysical exploration, and more particularly to mapping surface and near surface features and processing artifacts from stacked and processed seismic data.

BACKGROUND

The seismic industry has experienced an increase in the number of seismic acquisition channels. The increased number of seismic acquisition channels has led to greater availability of data acquired in seismic surveys. However, conventional seismic data processing and analysis methods can be less useful for handling the increased amounts of data provided by modem seismic acquisition systems. For example, near surface analysis related to the increased size of the seismic datasets can pose challenges. Traditional methods for analysis of the subsurface domain, based on interactive procedures where input of an analyst is required can require time-consuming human intervention for quality control of the data.

SUMMARY

Methods, apparatus, and systems for mapping surface and near surface features and processing artifacts from stacked and processed seismic data are disclosed. In some implementations, a computer system receives a three-dimensional (3D) seismic cube including seismic reflectivity data obtained at a geographical location. The computer system generates a vertical analysis window of the 3D seismic cube. The computer system extracts a second 3D seismic cube from the seismic reflectivity data based on the vertical analysis window. The second 3D seismic cube has multiple vertical amplitude traces associated with the seismic reflectivity data. The computer system generates 3D data comprising multiple frequency traces from the multiple vertical amplitude traces using a domain transform. The computer system generates a two-dimensional (2D) map from the 3D data. The 2D map represents geographical features of the geographical location.

In some implementations, generating the 3D data includes analyzing, by the computer system, a frequency content of the seismic reflectivity data at multiple locations of the second 3D seismic cube.

In some implementations, the computer system receives a minimum frequency, a maximum frequency, and a frequency increment. The frequency content of the seismic reflectivity data is analyzed using the minimum frequency, the maximum frequency, and the frequency increment.

In some implementations, the computer system generates a scaled 2D map from the 2D map using a scaling function.

In some implementations, the geographical features of the geographical location include at least one of a karst, a void, a cave, or a sinkhole.

In some implementations, generating the vertical analysis window includes receiving, by the computer system, a time interval or a depth interval of the seismic reflectivity data. The computer system determines the vertical analysis window from the time interval or the depth interval.

In some implementations, the 3D seismic cube is a post-stack reflected-wave seismic cube.

DETAILED DESCRIPTION

The implementations disclosed provide methods for mapping surface and near surface features and processing artifacts from stacked and processed seismic data. The implementations disclosed provide useful means to evaluate the quality of near surface processing, near surface drilling hazards, and other surface or near surface features. The implementations are advantageous for mapping surface features that can affect seismic and near surface drilling hazards, such as karsts, voids, or caves. Moreover, the implementations assess the quality of near surface velocity modeling and static corrections by showing their effects as final processed seismic cubes. Unlike traditional methods that require pre-stack gathers or refracted seismic waves or both as well as inversion or modeling steps to construct a subsurface model, such as velocity models, the implementations disclosed here increase the processing speed by using post-stack and post-processed reflected wave seismic cubes. Thus, information about the near surface is obtained sooner than traditional methods.

Figure 1:
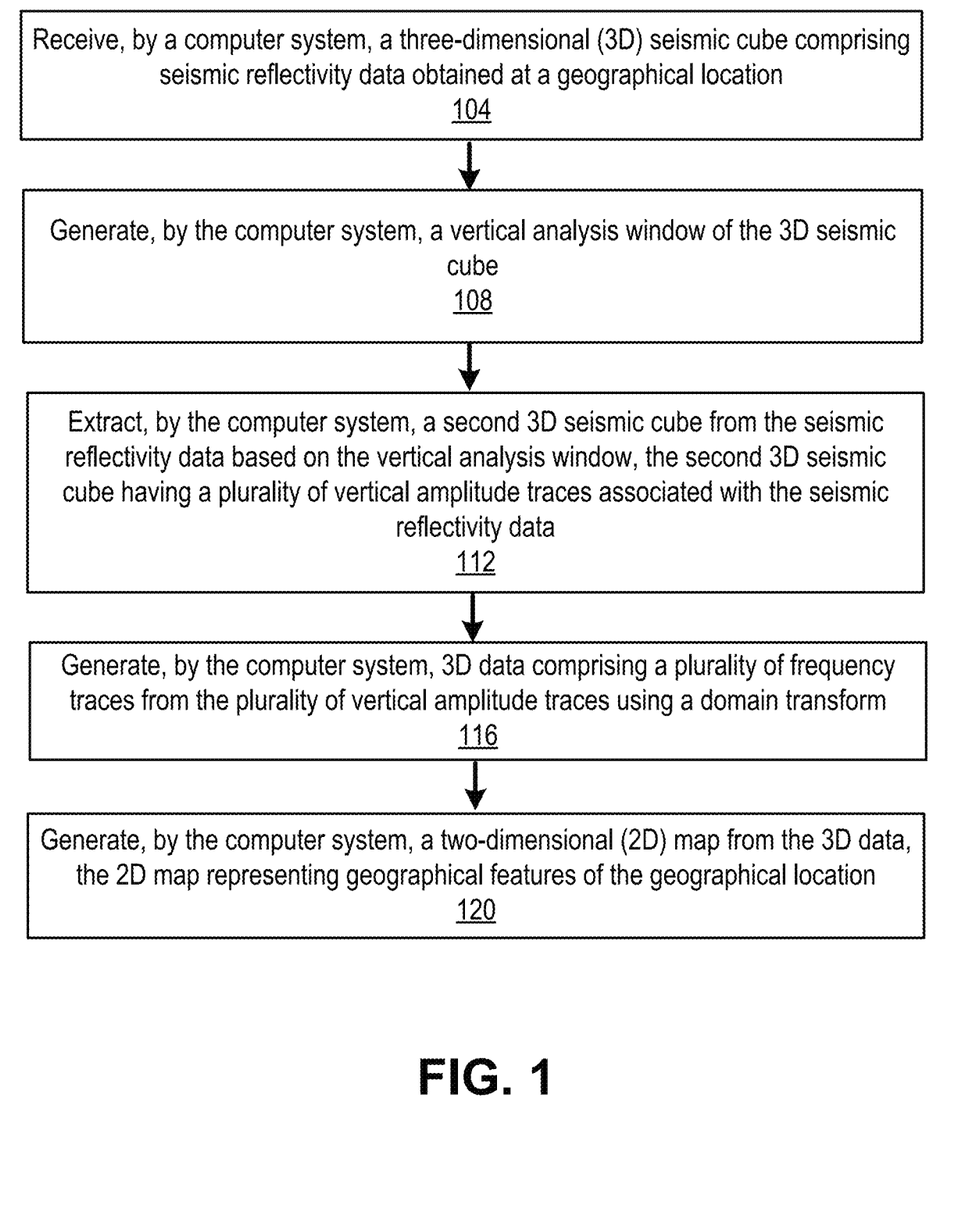
FIG. 1 illustrates a process for mapping surface and near surface features.

FIG. 1 illustrates a process for mapping surface and near surface features. In some implementations, the process is performed by a computer system. Such a computer system is described in more detail at the end of this specification.

In step 104, the computer system receives a three-dimensional (3D) seismic cube including seismic reflectivity data obtained at a geographical location. In some implementations, the 3D seismic cube is a post-stack reflected-wave seismic cube. The post-stack reflected-wave cube refers to seismic survey data at the final processing stage where the pre-stack gathers are processed and stacked in a manner to produce a cube where the source and receiver are on the same positon on the surface. The stacked cube is sometimes called a "zero-offset stack." The post-stack seismic dataset is typically smaller than the pre-stack dataset by roughly a thousand folds as a result of the stacking process. The 3D seismic cube can refer to seismic data capable of showing a 3D image of a reservoir. The 3D cube is a closely spaced grid of 2D seismic lines with interpolation. Thus, the 3D cube can be sliced vertically to create 2D lines or sliced horizontally to create time views of the traveling signal. For example, surface features, near surface features, and processing artifacts can be mapped from a processed, post stack 3D seismic cube. Processing artifacts refer to outliers or noise related to the surface upon which the survey was performed, artifacts related to the instrumentation or procedure used, and noise in the data obscuring the near-surface image. The mapping can be advantageous to evaluate the quality of near-surface processing, near-surface drilling hazards, and other surface or near-surface features. The processed, stacked 3D seismic cube is used as input, and a two-dimensional (2D) surface map is generated as output.

In some implementations, the computer system receives the 3D seismic cube and optional parameters, such as a vertical analysis window. The computer system analyzes the frequency content at each X,Y location and then uses a custom function to transform this frequency analysis to a 2D map. Other optional parameters, such as a minimum frequency, a maximum frequency, and a frequency increment can also be received.

In step 108, the computer system generates a vertical analysis window of the 3D seismic cube. The computer system can receive parameters, such as a vertical analysis window (time or depth interval) and an output frequency band in step 104. Such parameters are optional. If the parameters are not specified in step 104, the computer system considers the entire vertical extent of the cube across all the frequencies. In some implementations, generating the vertical analysis window includes receiving a time interval or a depth interval of the seismic reflectivity data. The computer system determines the vertical analysis window from the time interval or the depth interval.

In step 112, the computer system extracts a second 3D seismic cube from the seismic reflectivity data based on the vertical analysis window. The second 3D seismic cube has multiple vertical amplitude traces associated with the seismic reflectivity data. Traditional processing methods for detecting near-surface artifacts typically require pre-stack gathers or refracted waves, while the implementations disclosed here used stacked and processed reflected waves. The implementations also do not require a modeling or inversion step to compute a 3D velocity model. Post-Stacking inversion transforms a single seismic information volume into an acoustic impedance volume by using seismic data. For example, by removing the wavelet from seismic data, a high-resolution image of the near-surface can be generated.

In step 116, the computer system generates 3D data including multiple frequency traces from the multiple vertical amplitude traces using a domain transform. An example of a process used to execute step 116 is illustrated and described in more detail with reference to FIG. 3A. For example, the computer system can analyze the second 3D seismic cube by running a Fourier transform (or a similar frequency transform, such as a wavelet transform) on a selected vertical window of the cube (second 3D seismic cube). A Fourier transform decomposes a function (often a function of the time, or a signal) into its constituent frequencies. The term Fourier transform refers to both the frequency domain representation and the mathematical operation that associates the frequency domain representation to a function of time. A wavelet transform refers to the decomposition of a signal into a set of basis functions consisting of contractions, expansions, and translations of a mother function $\psi(t)$, called a wavelet. If no vertical analysis window is selected, the computer system analyzes the entire first 3D seismic cube.

In some implementations, generating the 3D data includes analyzing a frequency content of the seismic reflectivity data at multiple locations of the second 3D seismic cube. For example, an output frequency or frequency band can be received in step 104. The frequency band can include a minimum frequency, a maximum frequency, and a frequency increment. In some implementations, the frequency content of the seismic reflectivity data is analyzed using the minimum frequency, the maximum frequency, and the frequency increment. For example, for near-surface drilling hazards, a 2D near-surface map is generated for checking when proposing a new location for drilling. If a near-surface hazard, such as a karst is present in the 2D map, the location of drilling can be changed to avoid the hazard. The 2D map can also be used to identify artifacts of near-surface processing and label the artifacts.

In step 120, the computer system generates a 2D map from the 3D data. The 2D map represents geographical features of the geographical location. In some implementations, the geographical features of the geographical location include at least one of a karst, a void, a caves, or a sinkhole. A karst is a topography formed from the dissolution of soluble rocks such as limestone, dolomite, and gypsum. A cave can be formed in the soluble rock limestone. A void refers to a cavern or a natural void in the ground. A sinkhole is a depression or hole in the ground caused by collapse of the surface layer. A function used to create the 2D map is illustrated and described in more detail with reference to FIG. 3B.

Generating the 2D map includes obtaining the selected frequencies, and stacking and scaling them to produce the 2D near-surface map. For example, a custom software algorithm is designed to compute a surface and near-surface 2D feature map from the processed and stacked 3D seismic cube. The 2D map attributes are useful for mapping surface features that can affect the seismic and near-surface drilling hazards, such as karsts, voids, or caves. The 2D map is also beneficial for assessing the quality of near-surface velocity modeling and static corrections by revealing the effects of the near-surface velocity modeling and static corrections from the processed 3D seismic cubes.

The implementations use the seismic 3D cube as input and generate the 2D map that represents surface or near-surface features. The features can include karsts, voids, caves, sinkholes, and other heterogeneities on the surface or below the surface. The implementations are based on the fact that if a feature or an object exists in the near-surface, it will have an imprint (shadow) for the full (or at least a large portion of) a vertical analysis window of the cube. The information about the near-surface is beneficial for detecting near-surface drilling hazards, such as caves and karsts to be avoided during drilling of a hydrocarbon reservoir. The implementations can also be used for assessing artifacts from seismic processing as a result of imperfect processing of the near-surface (as a result of inadequate near-surface velocity modeling or static corrections).

In some implementations, the computer system generates a scaled 2D map from the 2D map using a scaling function. An example scaling function used to generate the scaled 2D map is illustrated and described in more detail with reference to FIG. 3C.

Figure 2:
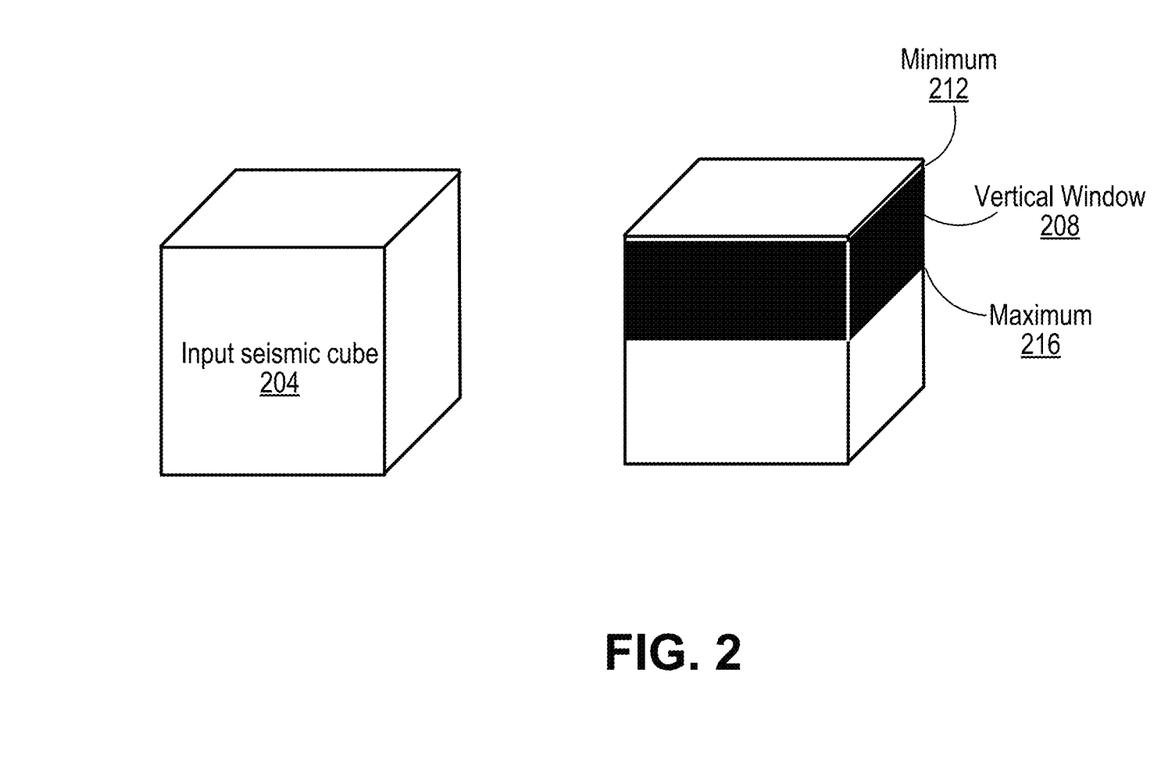
FIG. 2 illustrates input data and parameters.

FIG. 2 illustrates input data and parameters. The input data includes the input 3D seismic cube 204. The seismic cube is a stacked, processed 3D cube including seismic reflectivity data. Optionally, the cube 204 can be flattened on a shallow horizon. This means that instead of using the cube as-is as input, the computer system can optionally select a horizon near the top of the cube (with an approximate time delay of 0 to 700 milliseconds) and then flatten the cube based on this horizon. Flattening is a procedure performed in seismic interpretation workflows. Flattening means each trace of the cube will be moved up or down by the difference between the height of the horizon at that point and the overall horizon average height. The flattening will produce a cube where this horizon appears to be flat everywhere. The flattening procedure will produce a cube from the original cube but with a vertical shift that can be different in different locations. Optionally, this cube can be supplied as input instead of the original cube.

The vertical analysis window 208 refers to a starting point (for example, the minimum point 212) and ending point (for example, the maximum point 216). If the reflectivity data of the seismic cube 204 is expressed in units of time, the minimum point 212 and maximum point 216 will be a start time and an end time. If the reflectivity data of the 3D seismic cube 204 is expressed in units of depth, the minimum point 212 and maximum point 216 will be a start depth and an end depth. To detect the near-surface features, the vertical analysis window 208 is typically shallow (for example, around 1 second or 2000 feet). If no vertical analysis window is provided, the entire extent of the vertical range of the seismic cube 204 is considered.

Figure 3A:
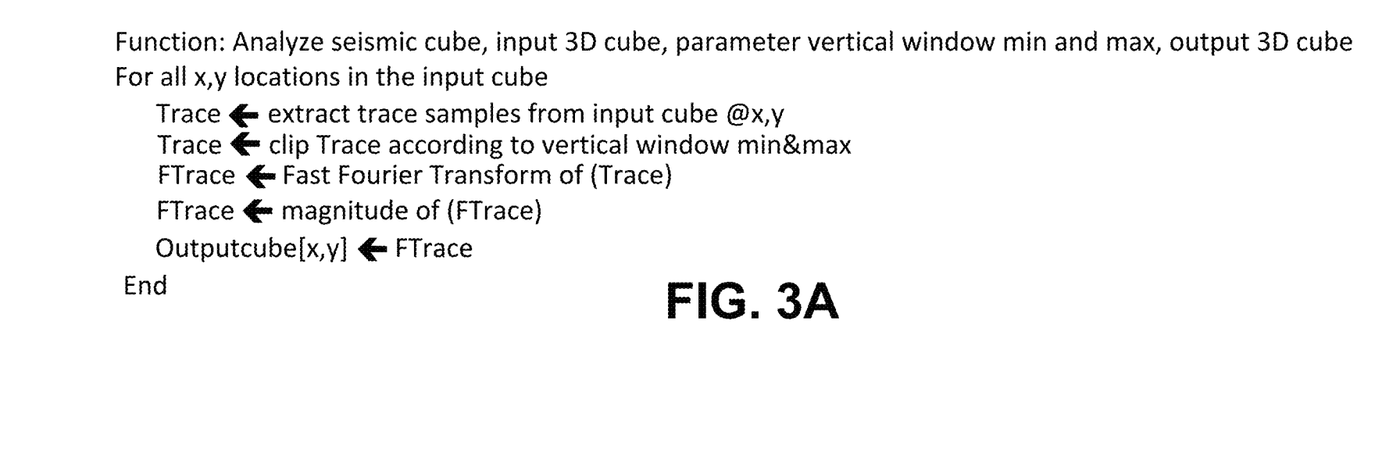
FIG. 3A illustrates a cube analysis process.

FIG. 3A illustrates a cube analysis process. The input to the process of FIG. 3A is the 3D cube 204 and the output is a second 3D cube (sometimes smaller than original cube 204). The seismic cube 204 is illustrated and described in more detail with reference to FIG. 2. A selected vertical analysis window of the first 3D cube 204 is extracted to generate a second 3D cube that is less than or equal to the first 3D cube 204 in vertical range. The first 3D cube 204 is illustrated and described in more detail with reference to FIG. 2. For each vertical amplitude trace of the second 3D cube, a frequency trace is generated using a domain transform, such as a Fast Fourier Transform (FFT). In other implementations, other frequency transforms, such as continuous wavelet transform can be used. When a FFT is used as shown in FIG. 3A, the complex set of values in the second 3D cube are converted to real values using the magnitude of the complex number, which is the frequency amplitude (strength). The resulting values are stored as the 3D data, described in more detail with reference to FIG. 1.

Figure 3B:
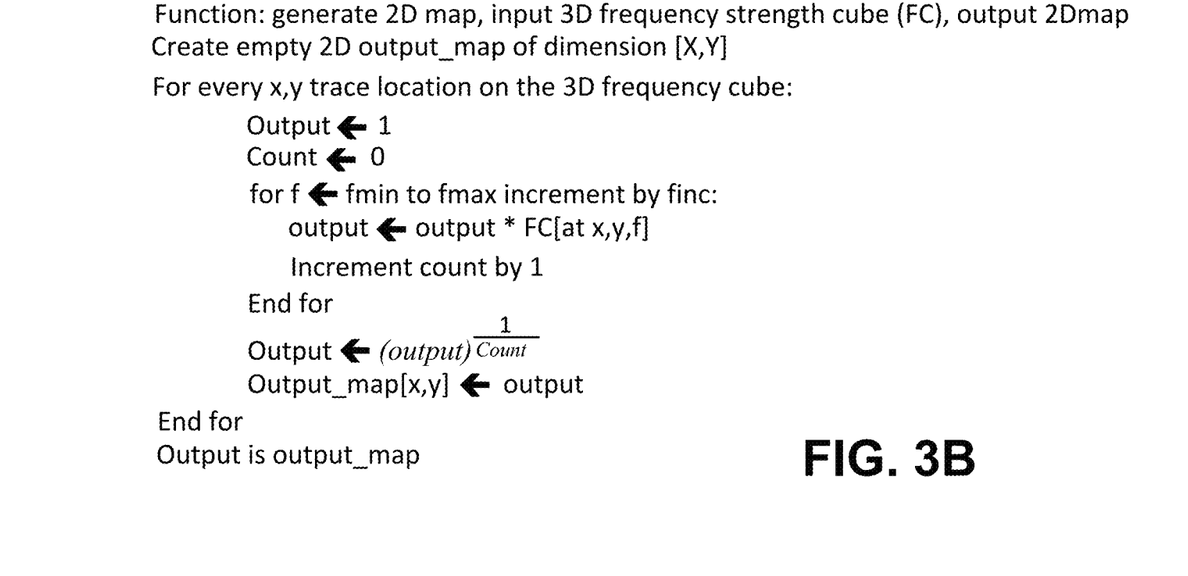
FIG. 3B illustrates a function used to create a two-dimensional (2D) map.

FIG. 3B illustrates a mapping function used to create a 2D map. The 2D map is generated from the 3D data generated by the cube analysis process illustrated and described in greater detail with reference to FIG. 3A. The 2D map is generated using the mapping function shown in FIG. 3B. The purpose of the mapping function is to transform the 3D data to the 2D map of near-surface features. The mapping function produces a single value for each surface location of the frequency-strength cube by stacking the vertical values (the traces) of the 3D frequency-strength cube at that location according to the formula illustrated in FIG. 3B. The result will be a 2D array of values representing a horizontal 2D plane. This 2D array of values will be converted to and visualized as a map after the subsequent scaling step and color table assignment step.

Figure 3C:
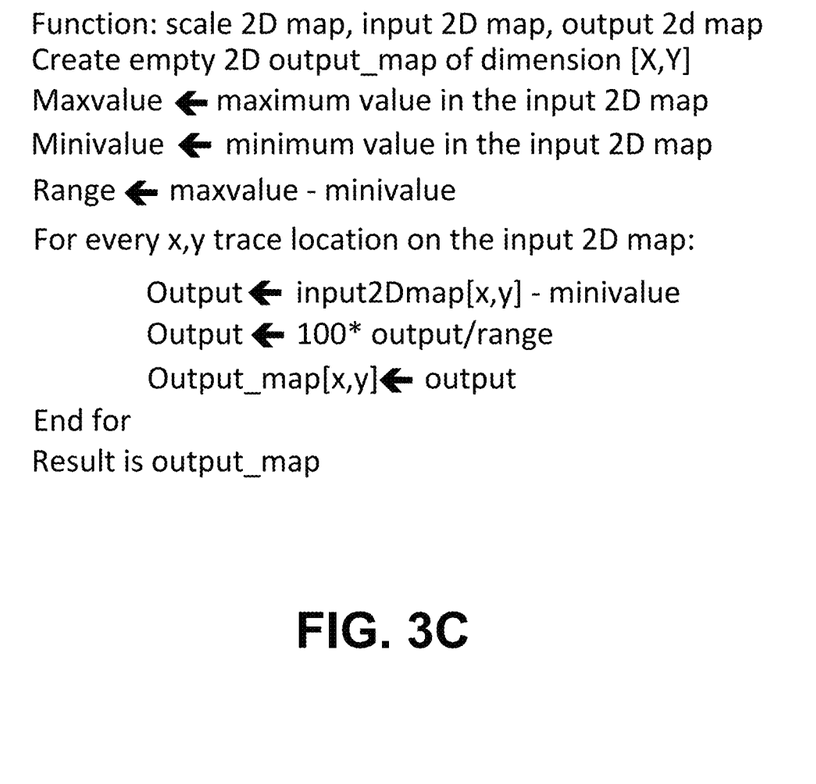
FIG. 3C illustrates a function used to scale a 2D map.

FIG. 3C illustrates a scaling function used to scale a 2D map. The scaling function shown in FIG. 3C uses the 2D map generated by the function illustrated and described in more detail with reference to FIG. 3B. The 2D map from FIG. 3B can contain arbitrary values. The arbitrary values are scaled using the scaling function to generate a scaled 2D map that contains only the values 0 to 100. The scaling shown in FIG. 3C is performed to increase a clarity of the scaled 2D map when color is applied to the scaled 2D map. For example, the scaling function shown in FIG. 3C scales the 2D map generated by the mapping function in FIG. 3B to produce a scaled 2D map useful for display with a color table. A color table is a one-to-one assignment relation where each value is assigned a different color in order to produce a visual representation of the values in the form of an image on a screen, for example on a display device of the computer system. In some implementations, a grayscale color map is used where the value 0 is assigned the black color and the value 100 is assigned the white color (or vice versa). Then each value between these two ends is assigned a grayscale color in linear, or sometimes, logarithmic proportions. In some implementations, the scaled 2D map can be used to detect features located near a given seismic surface that is not near the top of the 3D seismic cube. For example, such features can include channels and other geological features.

Figure 4A:
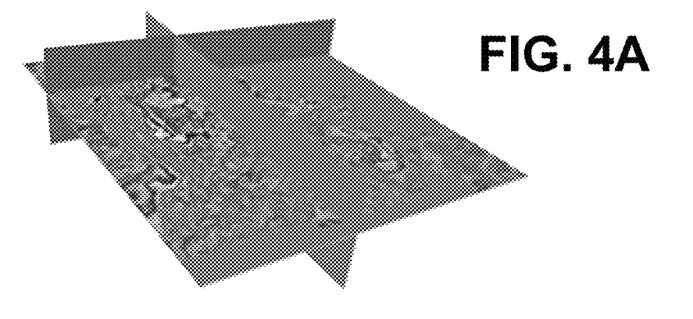
FIG. 4A illustrates a stacked three-dimensional (3D) cube.
Figure 4B:
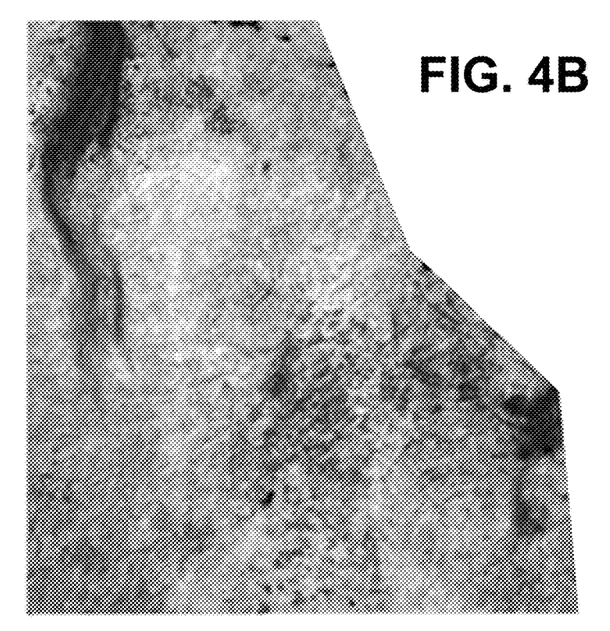
FIG. 4B illustrates a 2D near-surface map.
Figure 4C:
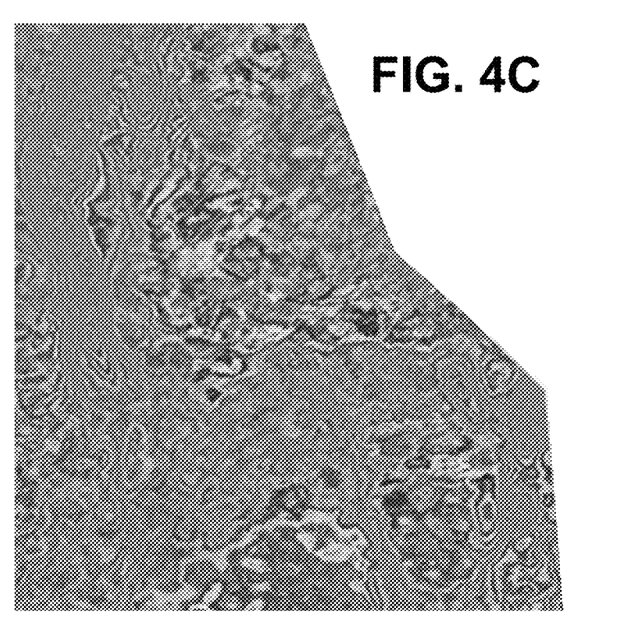
FIG. 4C illustrates a near-surface 2D slice of a seismic cube.

FIG. 4A illustrates a stacked three-dimensional 3D cube. The example shown in FIG. 4A illustrates detection of near-surface objects using the disclosed implementations. FIG. 4B illustrates a 2D near-surface map generated from the stacked three-dimensional 3D cube of FIG. 4A using the process illustrated and described in more detail with reference to FIG. 1. Compared to traditional methods that require pre-stack gathers or refracted seismic waves or both as well as inversion or modeling to construct a subsurface model, such as a velocity model, the implementations disclosed provide rapid means to use post-stack and post-processed reflected wave seismic cubes to reveal the near-surface. FIG. 4C illustrates a near-surface 2D slice of a seismic cube. The example horizontal slice of input seismic data shown in FIG. 4C reveals that geographical features cannot typically be identified using the original seismic data.

Figure 5:
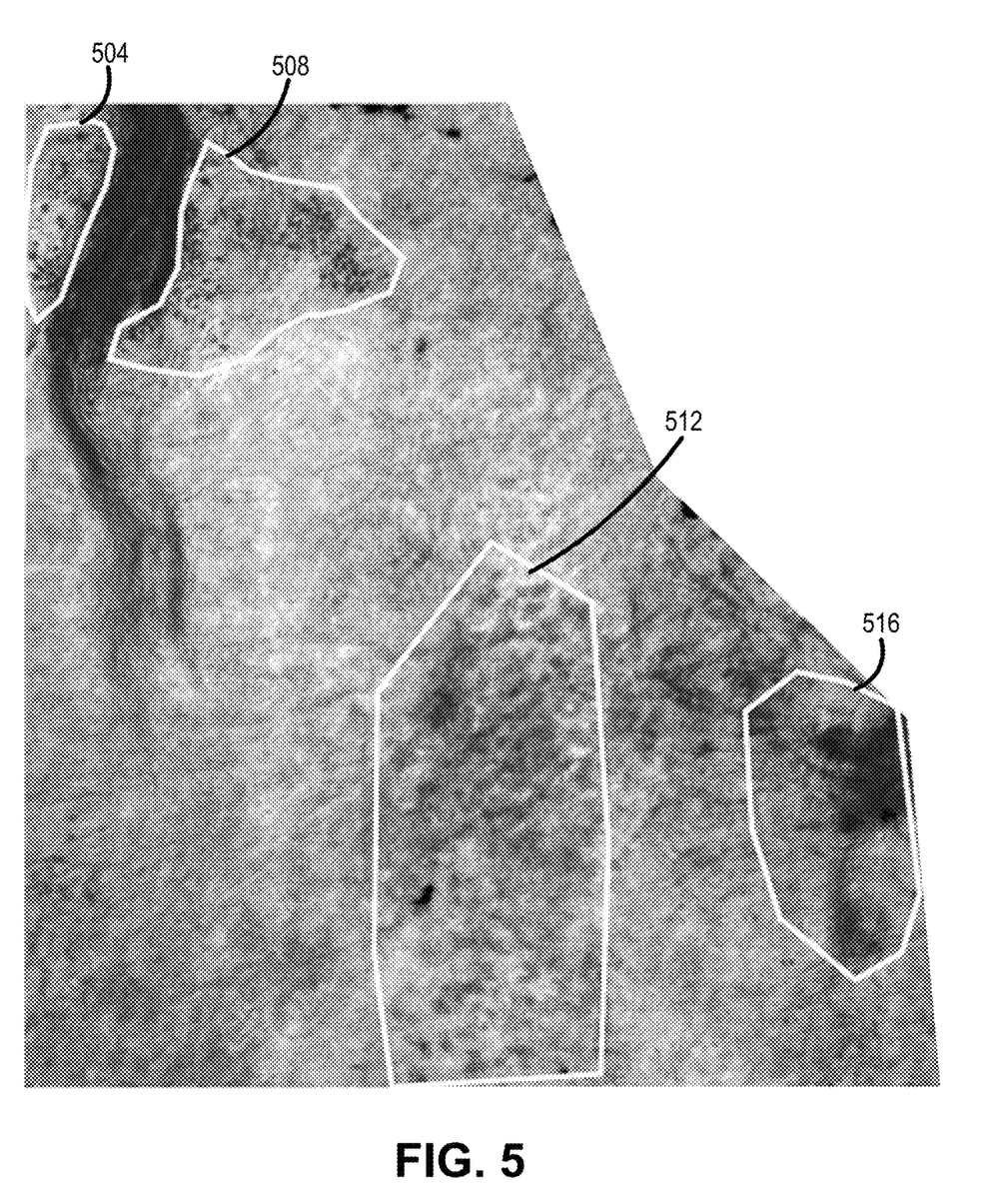
FIG. 5 illustrates a near-surface 2D map.

FIG. 5 illustrates a near-surface 2D map. The output near-surface 2D map shown in FIG. 5 contains both surface features and near-surface features. The circular features 504 and 508 can be sinkholes, caves, or karsts at the surface or near-surface. The feature 512 can be a farm or an irrigation area. The feature 516 is a flood plain. In some implementations, the 2D map is compared with a satellite image. Farms, mountains, and other surface features are revealed by the satellite image. Features that do not show up on a satellite image lie below the surface.

Figure 6A:
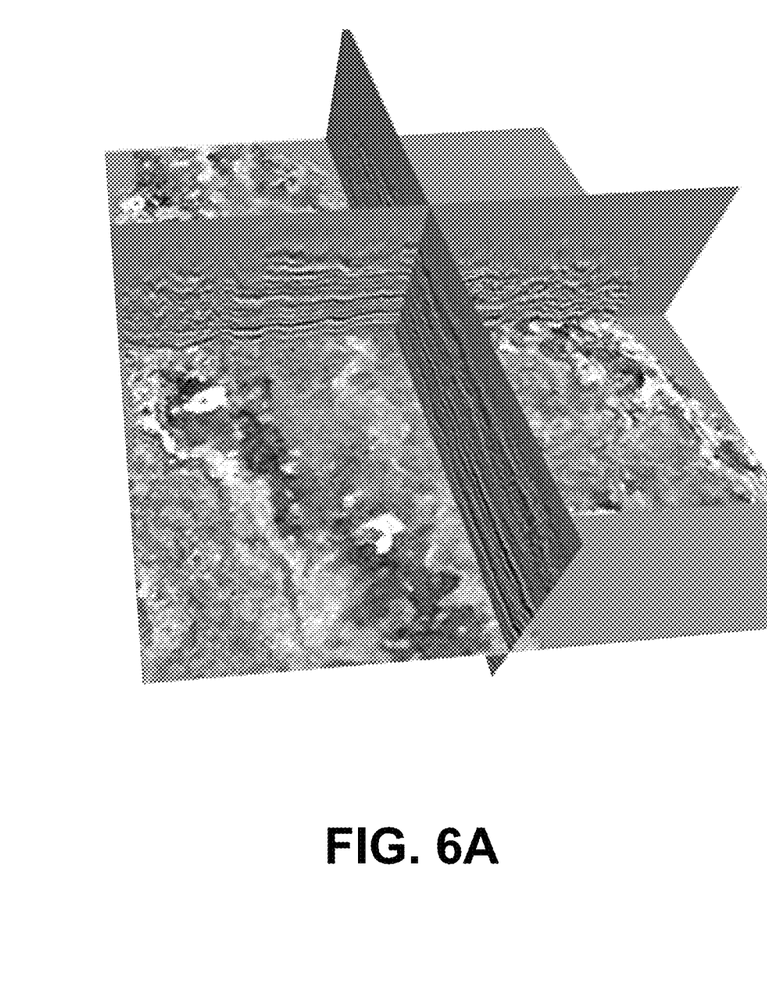
FIG. 6A illustrates an input 3D seismic cube.

FIG. 6A illustrates an input 3D seismic cube. The example shown in FIG. 6A assesses the quality of the processing of a 3D merged survey. A merged 3D survey results when a larger survey is divided into smaller blocks (areas) upon acquisition and processing of seismic data or when a new seismic survey is acquired adjacent to or partially overlapping with a previously acquired and processed survey. In such cases, it is preferable to have all the data in one merged survey, which requires that all data acquired in separate stages be processed and merged. Beneficially, the blocks or survey boundaries should not appear in the final merged survey after processing. Using the implementations disclosed here, it can be uncovered whether some blocks have near-surface processing artifacts that they should not have due to their processing, and that the subsequent merge with other blocks can be improved. FIG. 6A especially highlights the quality of near-surface velocity modeling and static corrections and the quality of the multi block merge. The resulting information is used to identify artifacts resulting from the seismic processing.

Figure 6B:
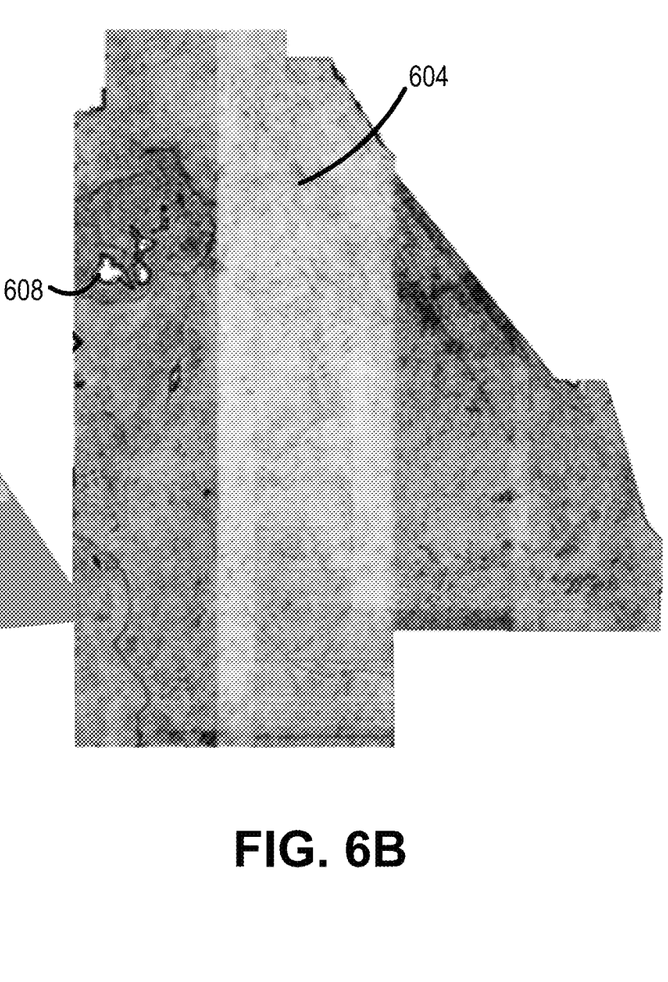
FIG. 6B illustrates an output near-surface 2D map.

FIG. 6B illustrates an output near-surface 2D map. The near-surface 2D example map shows the boundaries of the blocks processed using different processing parameters and models. The example in FIG. 6B also shows that the block 604 is of greater near-surface quality. The mountain 608 can affect seismic acquisition and near-surface processing. Such information is useful in interpreting the resulting 3D seismic cube or to repeat the processing procedure using the information on where to improve the near surface-processing.

The methods described can be performed in any sequence or in any combination and the components of respective implementations may be combined in any manner. The machine-implemented operations described above can be implemented by a computer system, programmable circuitry, configured by software or firmware, or entirely by special-purpose (hardwired) circuitry, or by a combination of such forms. Such special-purpose circuitry (if any) can be in the form of, for example, one or more application-specific integrated circuits, programmable logic devices, field-programmable gate arrays, or system-on-a-chip systems.

Software or firmware to implement the techniques introduced here may be stored on a machine-readable storage medium and may be executed by one or more general-purpose or special-purpose programmable microprocessors. A machine-readable medium, as the term is used herein, includes any mechanism that can store information in a form accessible by a machine (a machine may be, for example, a computer, network device, cellular phone, personal digital assistant, manufacturing tool, or any device with one or more processors). For example, a machine-accessible medium includes recordable or non-recordable media (for example, RAM or ROM, magnetic disk storage media, optical storage media, or flash memory devices).

The computer system can include a display device, such as a computer monitor, a liquid crystal display (LCD), an organic light-emitting diode (OLED), or an active-matrix organic light-emitting diode (AMOLED) to display results of the processes disclosed.

The term logic, as used herein, means special-purpose hardwired circuitry, such as one or more application-specific integrated circuits, programmable logic devices, field programmable gate arrays, or other similar devices, programmable circuitry programmed with software or firmware, such as one or more programmed general-purpose microprocessors, digital signal processors or microcontrollers, system-on-a-chip systems, or other similar devices, or a combination of the forms.

What is claimed is:

1. A method comprising:
   receiving, by a computer system, a three-dimensional (3D) seismic cube comprising seismic reflectivity data obtained at a geographical location;
   generating, by the computer system, a vertical analysis window of the 3D seismic cube;
   extracting, by the computer system, a second 3D seismic cube from the seismic reflectivity data based on the vertical analysis window, the second 3D seismic cube having a plurality of vertical amplitude traces associated with the seismic reflectivity data;
   calculating, by the computer system, Fast Fourier Transform (FFT) of the plurality of vertical amplitude traces;
   generating, by the computer system, 3D data based on a magnitude of the transformed plurality of vertical amplitude traces; and
   generating, by the computer system, a two-dimensional (2D) map from the 3D data, the 2D map representing geographical features of the geographical location.

2. The method of claim 1, wherein the generating the 3D data comprises analyzing, by the computer system, a frequency content of the seismic reflectivity data at a plurality of locations of the second 3D seismic cube.

3. The method of claim 2, further comprising receiving, by the computer system, a minimum frequency, a maximum frequency, and a frequency increment, wherein the frequency content of the seismic reflectivity data is analyzed using the minimum frequency, the maximum frequency, and the frequency increment.

4. The method of claim 1, further comprising generating, by the computer system, a scaled 2D map from the 2D map using a scaling function.

5. The method of claim 1, wherein the geographical features of the geographical location comprise at least one of a karst, a void, a caves, or a sinkhole.

6. The method of claim 1, wherein the generating the vertical analysis window comprises:
   receiving, by the computer system, a time interval or a depth interval of the seismic reflectivity data; and
   determining, by the computer system, the vertical analysis window from the time interval or the depth interval.

7. The method of claim 1, wherein the 3D seismic cube is a post-stack reflected-wave seismic cube.

8. A non-transitory computer-readable storage medium storing instructions executable by a computer system, the instructions when executed by the computer system cause the computer system to:
   receive a three-dimensional (3D) seismic cube comprising seismic reflectivity data obtained at a geographical location;
   generate a vertical analysis window of the 3D seismic cube;
   extract a second 3D seismic cube from the seismic reflectivity data based on the vertical analysis window, the second 3D seismic cube having a plurality of vertical amplitude traces associated with the seismic reflectivity data;
   calculate, by the computer system, Fast Fourier Transform (FFT) of the plurality of vertical amplitude traces;
   generate, by the computer system, 3D data based on a magnitude of the transformed plurality of vertical amplitude traces; and
   generate a two-dimensional (2D) map from the 3D data, the 2D map representing geographical features of the geographical location.

9. The non-transitory computer-readable storage medium of claim 8, wherein the generating the 3D data comprises analyzing a frequency content of the seismic reflectivity data at a plurality of locations of the second 3D seismic cube.

10. The non-transitory computer-readable storage medium of claim 9, wherein the instructions further cause the computer system to receive a minimum frequency, a maximum frequency, and a frequency increment, wherein the frequency content of the seismic reflectivity data is analyzed using the minimum frequency, the maximum frequency, and the frequency increment.

11. The non-transitory computer-readable storage medium of claim 8, wherein the instructions further cause the computer system to generate a scaled 2D map from the 2D map using a scaling function.

12. The non-transitory computer-readable storage medium of claim 8, wherein the geographical features of the geographical location comprise at least one of a karst, a void, a caves, or a sinkhole.

13. The non-transitory computer-readable storage medium of claim 8, wherein the generating the vertical analysis window comprises:
   receiving, by the computer system, a time interval or a depth interval of the seismic reflectivity data; and
   determining, by the computer system, the vertical analysis window from the time interval or the depth interval.

14. The non-transitory computer-readable storage medium of claim 8, wherein the 3D seismic cube is a post-stack reflected-wave seismic cube.

15. A computer system comprising:
   one or more computer processors; and a non-transitory computer-readable storage medium storing instructions executable by the one or more computer processors, the instructions when executed by the one or more computer processors cause the one or more computer processors to:
- receive a three-dimensional (3D) seismic cube comprising seismic reflectivity data obtained at a geographical location;
- generate a vertical analysis window of the 3D seismic cube;
- extract a second 3D seismic cube from the seismic reflectivity data based on the vertical analysis window, the second 3D seismic cube having a plurality of vertical amplitude traces associated with the seismic reflectivity data;
- calculate, by the computer system, Fast Fourier Transform (FFT) of the plurality of vertical amplitude traces;
- generate, by the computer system, 3D data based on a magnitude of the transformed plurality of vertical amplitude traces; and
- generate a two-dimensional (2D) map from the 3D data, the 2D map representing geographical features of the geographical location.

16. The computer system of claim 15, wherein the generating the 3D data comprises analyzing a frequency content of the seismic reflectivity data at a plurality of locations of the second 3D seismic cube.

17. The computer system of claim 16, wherein the instructions further cause the one or more computer processors to receive a minimum frequency, a maximum frequency, and a frequency increment, wherein the frequency content of the seismic reflectivity data is analyzed using the minimum frequency, the maximum frequency, and the frequency increment.

18. The computer system of claim 15, wherein the instructions further cause the one or more computer processors to generate a scaled 2D map from the 2D map using a scaling function.

19. The computer system of claim 15, wherein the geographical features of the geographical location comprise at least one of a karst, a void, a caves, or a sinkhole.

20. The computer system of claim 15, wherein the generating the vertical analysis window comprises:
- receiving, by the computer system, a time interval or a depth interval of the seismic reflectivity data; and
- determining, by the computer system, the vertical analysis window from the time interval or the depth interval.

* * * * *